United States Patent [19]
Leonard

[11] 3,888,155
[45] June 10, 1975

[54] FINGER PATTERN INDICATOR

[76] Inventor: Verna M. Leonard, 8701 Hwg. 41, Fresno, Calif. 93710

[22] Filed: July 24, 1974

[21] Appl. No.: 491,257

[52] U.S. Cl. ............................ 84/471; 84/485
[51] Int. Cl. .................................. G09b 15/02
[58] Field of Search ............... 84/470–474, 84/477 R, 483, 485

[56] References Cited
UNITED STATES PATENTS
2,649,008   8/1953   Bova et al. ............................ 84/474

*Primary Examiner*—Richard B. Wilkinson
*Assistant Examiner*—John F. Gonzales
*Attorney, Agent, or Firm*—Ralph S. Branscomb

[57] ABSTRACT

The invention is an aid for teaching children basic keyboard fingering and comprises an envelope with five windows in the front, a dial displaying a right and left hand with numbered fingers which align with the windows, and replaceable sheets which are inserted into the envelope and display scale tone names which appear through the windows. Staffs on the replaceable sheets either display the written notes or are provided in blank to permit the user to write in the notes corresponding to the finger position. A melody is written in scale tone names on the bottom of each sheet which can be played on a piano.

5 Claims, 4 Drawing Figures

FINGER PATTERN INDICATOR

BACKGROUND OF THE INVENTION

One of the first things that a child must learn when beginning the study of music is basic keyboard fingering, which is generally taught by providing the student with simplified sheet music having the individual notes numbered in accordance with the numbering of the fingers used to play them. This system becomes tiresome to the child who often will begin to ignore the numbering when not under supervision.

There is a need for an imaginative teaching aid which will capture the student's fancy and provide for involvement with the music beyond the mere playing of notes.

SUMMARY OF THE INVENTION

The present invention fulfills the above-mentioned need and comprises an envelope having five windows or apertures near the top and a dial which passes through a slot in the front panel of the envelope so that the lower half of the dial is hidden from view. The dial has displayed on opposite sides of its forward surface a left and right hand with the fingers being numbered one to five beginning with the thumbs, and the fingers point to the individual windows when the selected hand is rotated into the upright position. A set of sheets may be provided in any desired number, each being identified with a particular key signature and having the names of scale tones selected from the key signature displayed in such a position on the sheet that they appear through the windows when the sheet is inserted in the pocket. A staff appears on an exposed portion of each sheet and may or may not have notes thereon corresponding to the named scale tones, and a melody written in named scale tones selected from those appearing through the windows is displayed on the lower portions of each sheet so that subsequent to correlating his individual fingers with particular tones, the student can play music using those tones.

DETAILED DESCRIPTION OF THE PREFERRED EMBODIMENT

Figures 1, 2:
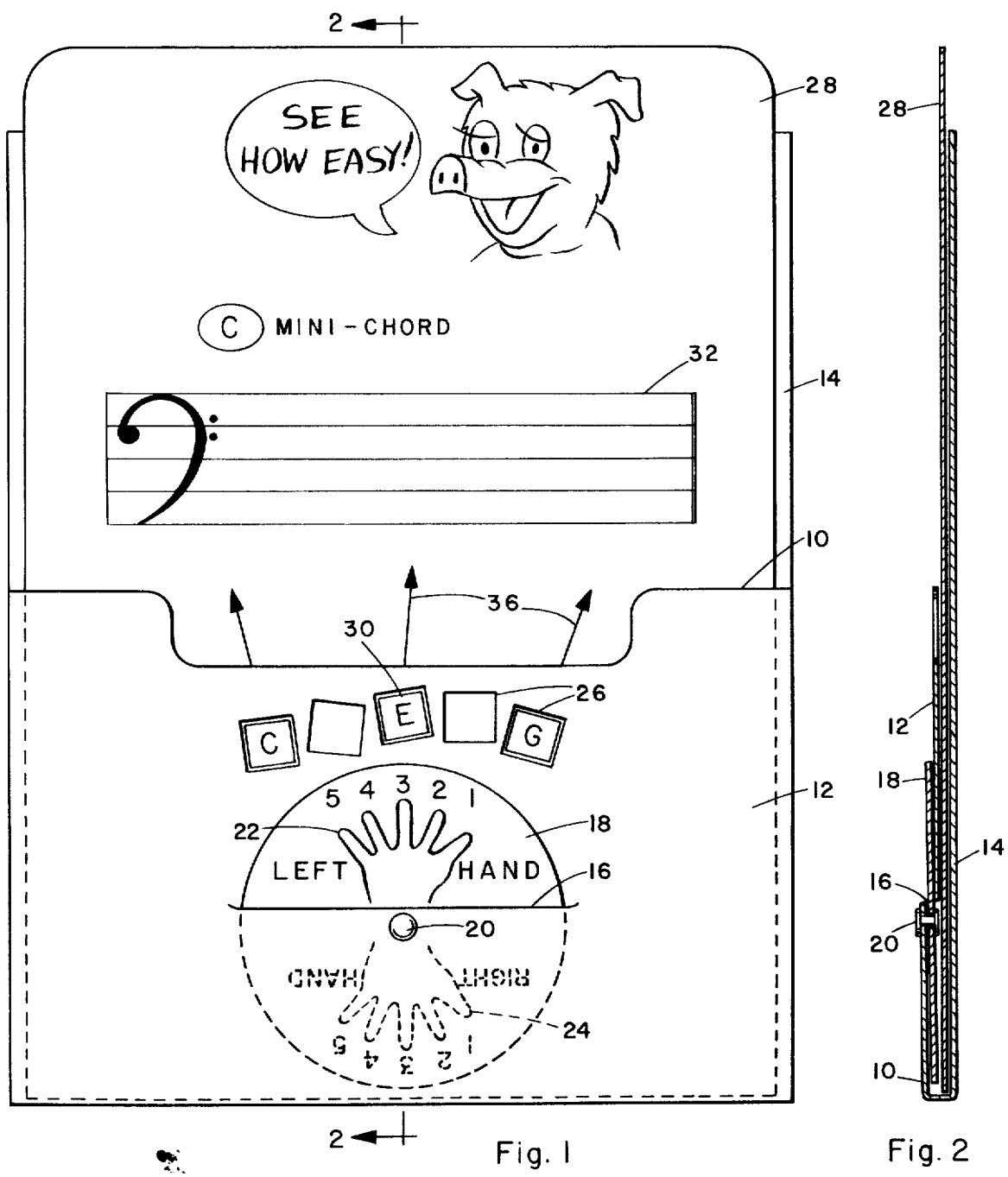
FIG. 1 is a front elevation view of the complete unit.
FIG. 2 is a vertical section taken along lines 2—2 of FIG. 1.
Figure 3:
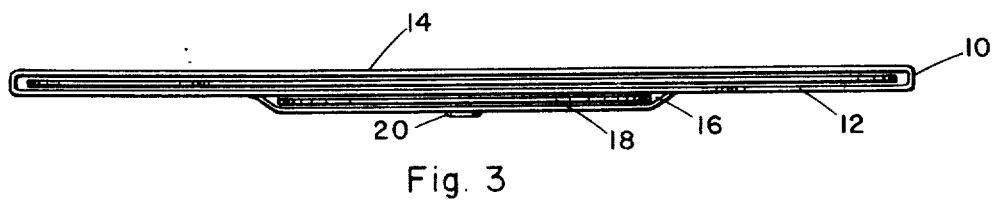
FIG. 3 is a view of the unit taken from the top of FIG. 1.

The invention comprises two basic components, the first being an envelope 10 defined by a front panel 12 and a rear panel 14, the rear panel preferably extending upward considerably beyond the forward panel and the forward panel being provided with a transverse slot 16 in which is disposed a dial 18. The dial is pivoted to the forward panel at 20 with the lower portion thereof being hidden in the pocket and the upper portion exposed, and a pair of hands representing a left hand 22 and a right hand 24 are displayed on opposite sides of the forward surface of the dial so that only one is visible at a time. The fingers on each hand are numbered consecutively beginning at the thumb and are displayed outwardly somewhat to individually point to five apertures 28 which are provided in the front panel generally adjacent the upper border of the dial.

The second component of the invention is a set of insert sheets which slip partway into the envelope 10, one of which is shown at 23. Each insert sheet represents one particular key signature and has a display of several scale tone names 30 which are selected from the first five tones of the scale of the key signature and appear through the apertures 26 in the order that they are fingered when the insert sheet is seated in the pocket.

Above the scale tones names 30 on the insert sheet is a staff 32 on which may appear notes corresponding to the scale tones. The notes may be visually tied to the scale tones with arrows 36, or they may be omitted entirely so that the student may have the experience of writing them in himself.

Figure 4:
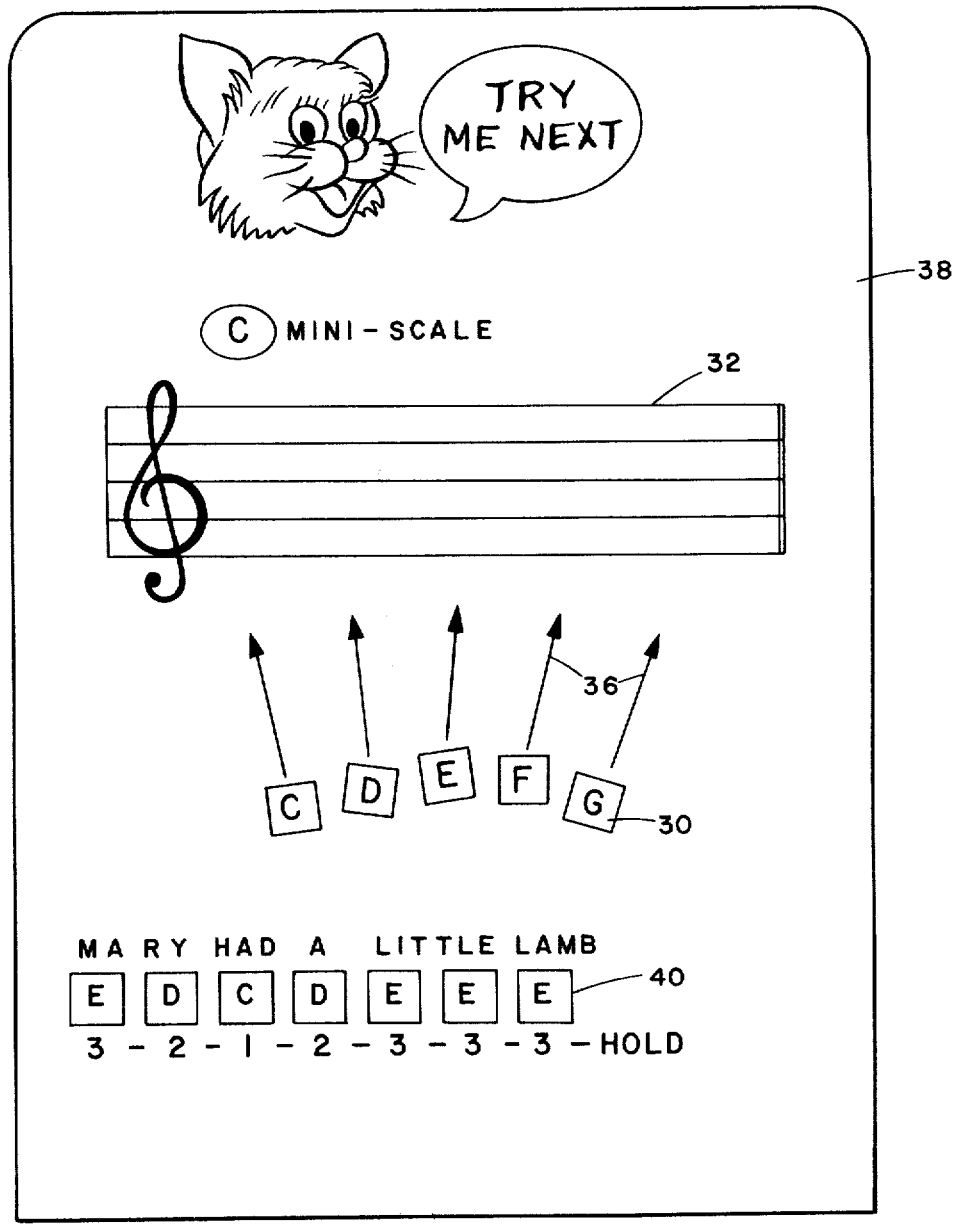
FIG. 4 is a front elevation view of an insert sheet which differs from the sheet shown in FIG. 1.

A second insert sheet 38 illustrated in FIG. 4 is provided with a melody 40 which is written in the scale tones selected from those which would appear through the apertures, the fingering numbers being indicated below each tone. Preferably each of the insert sheets is provided with a melody or scale at the bottom.

The operation of the device is as follows. The student selects or is given an insert sheet, for example sheet 28, with which to work, and he inserts the sheets into the pocket to reveal the scale tone names through the windows 26. It should be noted that the invention is directed primarily toward very young children who are just beginning, for this reason sheet 28 is only provided with the scale tones C, E, and G, which represent a major chord.

Upon noticing the bass clef symbol on the staff, the student will realize that the left hand will be used and rotates the dial so that the left hand 22 aligns with the apertures. He now sees that the three scale tones are played with the fifth, third, and first fingers of the left hand, and from the staff he associates the notes with their names and fingers. After briefly contemplating these associations, he removes the sheet from the envelope, places it on a piano keyboard and plays the melody displayed on the lower portion of the sheet, the melody being confined to the notes previously learned.

This process is repeated with different insert sheets which progress to five scale tones as does sheet 38, and the notes on the staffs are placed in different octaves of the keyboard so that the uniformity of the hand position and finger numbering in all the octaves is learned. It is also possible to display the notes 34 not as a scale but as a chord or series of chords on the staff, and the melody 40 may include chords, so that a variety of the insert sheets in the key of C alone could be used, and other keys taught as the student progresses.

I claim:

1. An aid for teaching keyboard fingering comprising:
    a. an envelope having a rear panel and a forward panel, said panels being joined together at their side edges and bottom edges to define an upwardly open envelope;
    b. a rotatable dial pivoted to said forward panel;
    c. indicia representing a left and right hand displayed on opposite portions of the forward face of said dial, said indicia including pointing fingers;
    d. said forward panel being provided with five apertures disposed substantially adjacent the periphery of said dial and positioned such that the dial is rotatable into positions in which the fingers of either the left hand or the right individually point toward the individual apertures;

e. at least one insert sheet having a lower portion dimensioned to fit within said envelope and having a plurlaity of scale tone names displayed thereon such that when said sheet is inserted in the envelope said scale tone names are visible through said apertures.

2. Structure according to claim 1 wherein said sheet has an upper exposed portion with a musical staff displayed thereon for the inscription by the user of the notes corresponding to the scale tone names visible through said apertures, and the lower portion of said sheet has a display of scale tone names selected from said visible scale tone names and arranged in a melody, whereby the user can remove the sheet and play the melody thereon.

3. Structure according to claim 2 wherein each of the scale tone names arranged in the melody is enclosed in a square and a number is provided beneath each square to indicate which of the player's fingers is to be used to play the particular scale tone in the overlying square.

4. Structure according to claim 2 wherein the fingers of each hand in said indicia are numbered from one to five, and said insert sheet has displayed thereon five arrows directed from each of said scale tone names toward spaced portions of said staff.

5. Structure according to claim 1 wherein said forward panel has a transverse slot therein and said dial passes through said slot such that the lower portion of said dial is within said envelope and an exposed upper portion thereof extends outside of said envelope substantially flush with said forward panel, whereby either the right hand or the left hand on said dial can be individually exposed by rotative adjustment of said dial.

* * * * *